United States Patent Office 3,427,363
Patented Feb. 11, 1969

3,427,363
REACTION PRODUCT OF ACRYLATE ESTER AND BUTADIENE POLYMER
Walter Lautenschlager, Christian Srna, and Ludwig Schuster, Ludwigshafen (Rhine), Germany, assignors to Badische Anilin- & Soda-Fabrik Aktiengesellschaft, Ludwigshafen (Rhine), Germany
No Drawing. Filed Sept. 21, 1965, Ser. No. 489,035
Claims priority, application Germany, Sept. 24, 1964,
B 78,646
U.S. Cl. 260—879        6 Claims
Int. Cl. C08f 45/68, 47/12, 15/26

ABSTRACT OF THE DISCLOSURE

Moldable compositions of (1) a butadiene polymer containing polymerizable ethylenically unsaturated groups with (2) a liquid organic monomer consisting mainly of the acrylic ester of tricyclo-[5,2,1,0$^{2,6}$]-decene-(3)-ol-(9) and processes for production of molded articles therewith.

---

This invention relates to an improvement in the process for the production of molded articles wherein a moldable composition comprising (1) 2 to 80 parts by weight of a butadiene polymer containing ploymerizable ethylenically unsaturated groups and
(2) 100 parts by weight of a liquid organic monomer containing polymerizable ethylenically unsaturated groups, is brought into the desired shape and cured by polymerization.

It is known that in the said process moldable compositions are used which contain for example the following butadiene polymers (1) and liquid organic monomers (2):

(1) Homopolymers of butadiene, particularly those in which the butadiene radicals are attached exclusively or mainly in 1,4-position; copolymers of butadiene, particularly those with styrene, α-methylstyrene, N-vinylpyridine and/or acrylonitrile, of which those copolymers are dominant in which the butadiene radicals are attached exclusively or mainly in 1,2-position; and mixtures of the specified butadiene polymers.

(2) Monomers having one, two or three polymerizable ethylenically unsaturated groups or mixtures of such monomers. Examples of such monomers are in particular: styrene and $C_1$- to $C_4$-alkyl esters of acrylic and methacrylic acid.

It is further known that the said process has a number of serious disadvantages. One disadvantage is that, even under the influence of polymerization initiators and polymerization promoters, relatively high temperatures are necessary to effect curing at an adequate rate. Another disadvantage is that the molded articles obtained are more or less opaque.

The present invention relates to an improvement in the said process by which the above-mentioned disadvantages are overcome. This improvement consists in using as the liquid organic monomer (2) a monomer consisting to the extent of at least 75%, preferably to the extent of at least 90%, and best of all to the extent of 100% by weight of the acrylic acid ester of tricyclo-[5,2,1,0$^{2,6}$]-decene-(3)-ol-(9).

Thus, the object of the present invention is: In the process for the production of molded articles wherein a moldable composition comprising:

(1) 2 to 80 parts by weight of a butadene polymer containing polymerizable ethylenically unsaturated groups and
(2) 100 parts by weight of a liquid organic monomer containing polymerizable ethylenically unsaturated groups is brought into the desired shape and cured by polymerization, the improvement which consists in using as the liquid organic monomer (2) a monomer consisting to the extent of 75%, preferably to the extent of at least 90%, and best of all to the extent of 100% by weight of the acrylic acid ester of tricyclo-[5,2,1,0$^{2,6}$]-decene-(3)-ol-(9).

As regards the butadiene polymer (1) appropriate conventional polymers or mixtures thereof, for example those described above, are suitable for the purposes of the invention. (Suitable polymers are described for example in Houben-Weyl, "Methoden der Organischen Chemie," 4th edition, Makromolekulare Stoffe I. vol. XIV/1, p. 630 to 733.)

The liquid organic monomer (2) consists to the extent of at least 75% by weight of the acrylic acid ester of tricyclo [5,2,1,0$^{2,6}$]-decene-(3)-ol-(9) (hereinafter referred to as AET for short). When the monomer does not consist exclusively of AET, it may contain as the additional monomers the appropriate conventional monomers or mixtures thereof, for example those described above.

As is usual, the moldable compositions may be stabilized against unintentional cure (polymerization). This may be done by adding conventional stabilizers, for example tertiary-butylhydroquinone, in conventional amounts, for example 0.005 to 0.05% by weight with reference to the total weight of butadiene polymer (1) plus liquid organic monomer (2).

The moldable compositions may also be used with the appropriate conventional additives or assistants, among which the following examples may be given: other types of moldable compositions, fillers, reinforcement, flame retardants and pigments.

Curing (polymerization) of the moldable compositions may be effected by appropriate conventional means, preferably by polymerization initiators plus polymerization promoters. The conventional initiators and promoters in the conventional amounts are suitable for this purpose. The following are examples: hydroperoxides, e.g., cyclohexane peroxide, in the amounts of 0.2 to 3% by weight as polymerization initiators together with metal salts, e.g. cobalt naphthenate, in amounts of 0.01 to 0.5% by weight as polymerization promoters; or diacyl peroxides, e.g. dibenzoyl peroxide, in the amounts of 0.2 to 3% by weight as polymerization initiators together with amines, e.g. dimethylaniline, in amounts of 0.2 to 3% by weight as polymerization promoters. (The percentages are given with reference to the total weight of butadiene polymer (1) plus liquid organic monomer (2).) In general, the curing temperature is chosen in the range of from 10° to 160° C.; preferably the curing is effected at room temperature.

The invention is illustrated by the following examples; the parts and percentages specified in the examples are by weight.

EXAMPLE 1

(A) Main components of the moldable composition:
(1) Butadiene homopolymer in which the butadiene radicals are attached mainly in 1,4-position and which has a mean molecular weight of about 1,200,000.

(2) Acrylic acid ester of tricyclo-[5,2,1,0$^{2,6}$]-decene-(3)-ol-(9) (AET) obtainable for example as follows:

720 parts of acrylic acid is placed in a vessel provided with a stirrer, thermometer and feed means. 3 parts of hydroquinone is dissolved in the acrylic acid and while stirring 22 parts of boron trifluoride is passed into the vessel. 660 parts of dicyclopentadiene is then allowed to flow in during the course of sixty minutes, while the temperature is kept at about 40° C. by external cooling. The temperature is then allowed to rise to 65° C. and maintained for four hours. Subsequently the excess acrylic acid is distilled off in vacuo (8 mm. Hg); the residue is taken up in pentane and washed three times with water, once with 10% aqueous sodium carbonate solution and once with 5% aqueous caustic soda solution. The organic layer is separated, the pentane is distilled off, 2 parts of phenothiazine is added to the residue, which is then distilled in vacuo. 883 parts of the acrylic acid ester (AET) is obtained.

(B) Preparation of the moldable composition:

4 parts of the butadiene polymer and 96 parts of AET (containing 0.01% of tertiary-butylpyrocatechol as a stabilizer) are stirred until a homogeneous solution has been formed.

(C) Preparation of molded articles by the process according to this invention:

(a) 100 parts of the moldable composition described under B is intimately stirred with 4.0 parts of a 50% suspension of cyclohexanone peroxide in dibutyl phthalate and 0.4 part of a 10% solution of cobalt naphthenate in styrene and poured into test tubes. At room temperature the composition gels within about twenty minutes and cures to clear, colorless, infusible moldings.

(b) 100 parts of the moldable composition described under B is intimately stirred with 2.0 parts of a 50% suspension of dibenzoyl peroxide in dibutyl phthalate and 2.0 parts of dimethylaniline and poured into test tubes. At room temperature the composition gels within 5 minutes and cures to clear, yellowish, in fusible moldings.

(c) Two layers of glass fiber mats are impregnated with the composition described under (a) (freshly prepared, containing peroxide and cobalt naphthenate) and covered with sheets of cellulose. After the molding has been cured at room temperature, the sheets are removed; a sheet having good transparency and good mechanical properties is obtained.

EXAMPLE 2

(A) The moldable composition is a homogeneous mixture of:

(1) 21 parts of a 80:20 butadiene-styrene copolymer in which the butadiene radicals are attached mainly in 1,2-position and which has a mean molecular weight of about 8,000.

(2) 49 parts of AET (containing 0.01% of tertiary-butylpyrocatechol as a stabilizer).

(3) 30 parts of a chloroparaffin (conventional flame retardant).

(4) 7 parts of tri-(β-chloroethyl) phosphate (conventional flame retardant).

(5) 2 parts of an expoxidized monoester of glycerol and versatic acid (conventional stabilizer for the flame retardants).

(B) Preparation of a molded article by the process according to this invention:

100 parts of the composition described under A is intimately stirred with 4 parts of a 50% suspension of cyclohexanone peroxide in dibutyl phthalate and 0.4 part of a 10% solution of cobalt naphthenate in styrene. Two layers of glass fiber matting are impregnated with this mixture and covered with sheets of cellulose. After the molding has been cured at room temperature, the sheets are removed; a self-extinguishing sheet is obtained.

We claim:

1. A process for production of molded articles which comprises forming a moldable composition of a butadiene polymer containing polymerizable ethylenically unsaturated groups and a liquid organic monomer containing ethylenically unsaturated groups in a respective ratio of 2–80:100 parts by weight, said monomer constituting at least 75% by weight of the acrylic acid ester of tricyclo-[5,2,1,0$^{2,6}$]-decene-(3)-ol-(9) and up to 25% by weight of a copolymerizable monomer selected from the group consisting of styrene and $C_1$–$C_4$ alkyl acrylates and methacrylates, bringing said mixture into the desired shape, and curing it by polymerization.

2. A process as claimed in claim 1 wherein said monomer constitutes at least 90% by weight of said acrylic acid ester of tricyclo-[5,2,1,0$^{2,6}$]-decene-(3)-ol-(9).

3. A process for production of molded articles which comprises forming a moldable composition of a butadiene polymer containing polymerizable ethylenically unsaturated groups and a liquid organic monomer consisting essentially of the acrylic acid ester of tricyclo-[5,2,1,0$^{2,6}$]-decene-(3)-ol-(9) at a respective ratio of 2–80:100 parts by weight, bringing said mixture into the desired shape, and curing it by polymerization.

4. A polymer consisting essentially of the interpolymer of a butadiene polymer containing polymerizable ethylenically unsaturated groups and a monomer containing polymerizable ethylenically unsaturated groups in a respective ratio of 2–80:100 parts by weight, said monomer being at least 75% by weight of the acrylic acid ester of tricyclo-[5,2,1,0$^{2,6}$]-decene-(3)-ol-(9) and up to 25% by weight of a copolymerizable monomer selected from the group consisting of styrene and $C_1$–$C_4$ alkyl acrylates and methacrylates.

5. A polymer as claimed in claim 4 wherein said acrylic acid ester of tricyclo-[5,2,1,0$^{2,6}$]-decene-(3)-ol-(9) constitutes at least 90% by weight of said monomer.

6. A polymer as claimed in claim 4 wherein said monomer consists essentially of said acrylic acid ester of tricyclo-[5,2,1,0$^{2,6}$]-decene-(3)-ol-(9).

References Cited

UNITED STATES PATENTS

| 2,414,089 | 1/1947 | Bruson | 260—486 XR |
| 2,462,400 | 2/1949 | Hoover | 260—486 XR |
| 2,838,479 | 6/1958 | Biletch | 260—89.5 XR |
| 3,300,545 | 1/1967 | Baer | 260—880 XR |

FOREIGN PATENTS

| 923,469 | 4/1963 | Great Britain. |

GEORGE F. LESMES, Primary Examiner.

U.S. Cl. X.R.

156—327; 161—204; 260—28.5, 83.5, 486, 880